S. W. CHESNUTT.
SWIVEL CASTER.
APPLICATION FILED JUNE 25, 1920.
1,367,301.
Patented Feb. 1, 1921.
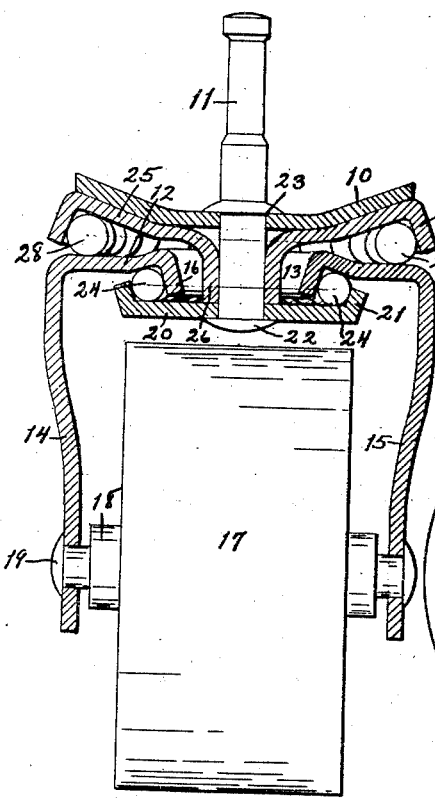
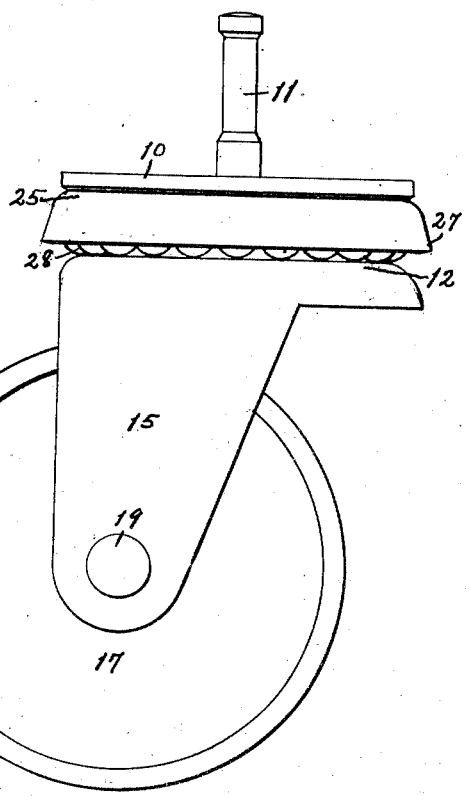
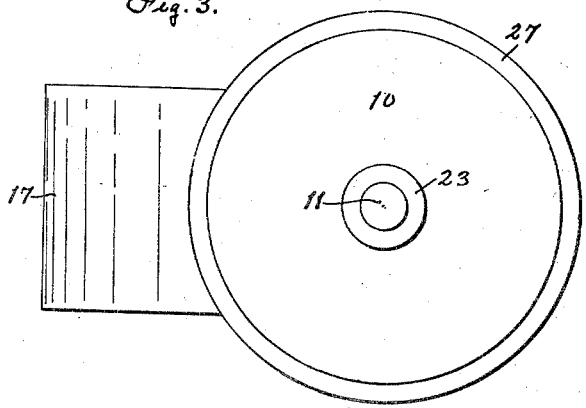
INVENTOR:
S. W. CHESNUTT
By Earl M. Sinclair
Atty.

UNITED STATES PATENT OFFICE.

SEIBERT W. CHESNUTT, OF KANSAS CITY, MISSOURI.

SWIVEL-CASTER.

1,367,301.  Specification of Letters Patent.  Patented Feb. 1, 1921.

Application filed June 25, 1920. Serial No. 391,757.

*To all whom it may concern:*

Be it known that I, SEIBERT W. CHESNUTT, a citizen of the United States of America, and resident of Kansas City, Jackson county, Missouri, have invented a new and useful Swivel-Caster, of which the following is a specification.

The object of this invention is to provide an improved construction for swivel casters, especially with respect to a relatively small type of caster adapted to be made principally by pressing and stamping and adapted for use on furniture and the like.

A further object of this invention is to provide improved means for connecting the top plate and wheel yoke of a swivel caster in such manner as to prevent relative lateral movement of said members.

A further object of this invention is to provide a swivel caster which shall be simple, inexpensive and durable.

My invention consists in the construction, arrangement and combination of elements hereinafter set forth, pointed out in my claims and illustrated by the accompanying drawings, in which—

Figure 1 is a vertical section of a swivel caster embodying my invention. Fig. 2 is a side elevation and Fig. 3 a plan of the same.

In the construction of the device as shown the numeral 10 designates a top plate which may be of any suitable size and shape and formed with a central aperture to receive a stem 11 adapted to enter a socket of a member to which the caster is to be attached. The central portion of the top plate 10 is plane, but the annular outer portion may be pressed so as to flare or incline upwardly therefrom. A wheel yoke is provided and is formed with a substantially horizontal portion 12 having a relatively large circular aperture 13 at its center and also formed with integral, spaced downwardly extending wings 14, 15. The wheel yoke preferably is formed by pressing and stamping and the horizontal portion 12 thereof is formed with an integral downwardly and inwardly inclined peripheral flange 16 surrounding the aperture 13. A supporting wheel 17, having a hub 18, is mounted between the wings 14, 15 of the yoke member, and an axle 19 passes through said hub and through the lower portions of the wings, said axle preferably being riveted or upset at its ends outside of said wings. A circular retaining plate 20 is provided and is formed with a hole at its center to receive the stem 11 and with a peripheral flange 21 inclining upwardly and outwardly at its outer margin. The stem 11 is formed at its lower end with a head 22 contacting the lower face of the retaining plate 20 and is also formed with a head, shoulder or flange 23 contacting the upper surface of the top plate 10. A row of bearing balls 24 are mounted on the retaining plate 20 and retained by the flange 21 thereof and the flange 16 of the horizontal portion 12 of the wheel yoke. The balls 24 particularly reduce and tend to eliminate friction which would or might be occasioned by relative lateral movement of the wheel carrying member and the load bearing member. An intermediate plate 25 is provided between the top plate 10 and the yoke member and retaining plate, and said intermediate plate is of generally circular form and is provided at its center with a hole surrounded by a downwardly extending flange or collar portion 26 fitted snugly to the stem or rivet 11 and contacting at its lower margin the upper surface of the retaining plate 20. The major portion of the intermediate plate preferably flares upwardly and outwardly somewhat from its center and throughout a considerable surface contacts with the lower surface of the top plate 10, outside of the central plane part thereof. The intermediate plate 25 is formed at its outer margin with a downwardly and outwardly inclined flange 27, and an annular row of bearing balls 28 are mounted on the horizontal portion 12 of the wheel yoke, contact the lower surface of the intermediate plate 25, and are retained by the peripheral flange 27 of said plate. The balls 28 are prevented from moving inwardly toward the axis of the caster by reason of the flared construction of the intermediate plate 25, and it is their function particularly to lessen and prevent friction and undue strain occasioned by a load placed upon the device; in other words to bear the vertical strain of the load.

It should be noted that the flanges 16, 21 and 27, constituting the ball races for the balls 24 and 28, are straight and plane in cross-section and not formed on curves conforming to the curvature of the balls. This construction overcomes and prevents any possibility of binding of the balls.

For certain purposes the stem 11 may be terminated immediately above the upper head or shoulder 23 thereof, and the top plate 10 be provided with any suitable means for securing it to a flat surface, as by means of screws or bolts passing through apertured ears, in a common manner.

The members are drawn tightly together by means of the stem or rivet 11, and the intermediate plate, contacting with a large area of the top plate and having its flange or collar 26 contacting with a considerable portion of the stem or rivet and also with the retaining plate 20, tends to provide absolute rigidity and durability and to prevent relative lateral movement of the parts.

This construction, which is simple and inexpensive, provides a caster with frictionless swiveling qualities and one which is very efficient in traveling over rough and uneven surfaces or where lateral strain is involved for any reason.

I claim as my invention—

1. A swivel caster, comprising a top plate, a yoke member having a substantially horizontal portion and downwardly extending wings between which a wheel is rotatably mounted, said horizontal portion being formed with a downwardly directed flange surrounding a relatively large central opening, a retaining plate mounted beneath said horizontal portion and formed with an upwardly directed peripheral flange outside of the first mentioned flange, bearing balls between said horizontal portion and retaining plate and retained by the flanges thereof, an intermediate plate between said top plate and horizontal portion and formed with a collar portion extending through the central opening of said horizontal portion and into contact with said retaining plate, securing means passing through said top plate, intermediate plate, horizontal portion and retaining plate and closely contacted by said collar portion, and bearing balls mounted on said horizontal portion, contacting the lower surface of said intermediate plate, said intermediate plate being formed with a downwardly directed flange on its outer periphery retaining the last named bearing balls.

2. A swivel caster, comprising a wheel yoke and a supporting wheel journaled therein, said yoke being formed with a horizontal upper portion with a relatively large central aperture, said portion also being formed with a downwardly and inwardly directed flange surrounding said aperture, a retaining plate mounted beneath said horizontal portion and formed with an upwardly and outwardly directed peripheral flange outside of the flange of said portion, bearing balls mounted between said retaining plate and horizontal portion and retained by the flanges thereof, a plate mounted above said horizontal portion and formed at its central portion with a vertically arranged collar member, bearing balls mounted between said upper plate and said horizontal portion, said upper plate being formed with a downwardly directed peripheral flange on its outer margin retaining the last named balls, and a securing member passing through said retaining member and the collar portion of said upper plate and clamping the parts firmly together.

3. A swivel caster, comprising a wheel yoke having a supporting wheel journaled therein, a retaining plate mounted within said yoke, a top plate, a securing member passing through said top plate and through the retaining plate, an intermediate plate mounted beneath said top plate and contacting with a considerable portion of the area thereof, bearing balls mounted between said yoke and intermediate plate, said intermediate plate being formed with a hole to receive said securing member and also being formed with a collar portion fitting snugly to said securing member and passing through the wheel yoke into contact with said retaining plate, and bearing balls mounted between the retaining plate and wheel yoke, said securing member holding said top plate rigidly against said intermediate plate and said retaining member rigidly against the collar portion of said intermediate plate.

Signed at Kansas City, in the county of Jackson and State of Missouri, this 16th day of June, 1920.

SEIBERT W. CHESNUTT.